United States Patent [19]
Okada et al.

[11] Patent Number: 6,152,845
[45] Date of Patent: Nov. 28, 2000

[54] POWER TRANSMISSION APPARATUS

[75] Inventors: Masahiko Okada; Akifumi Uryu; Kazuya Kimura, all of Kariya, Japan

[73] Assignee: Kabushiki Kaisha Toyoda Jidoshokki Seisakusho, Kariya, Japan

[21] Appl. No.: 09/205,406

[22] Filed: Dec. 3, 1998

[30] Foreign Application Priority Data

Dec. 11, 1997 [JP] Japan .................................. 9-341281

[51] Int. Cl.⁷ .............................. F16H 57/04; F04B 1/26
[52] U.S. Cl. ........................................... 474/93; 417/222.2
[58] Field of Search .............................. 417/222.2, 269, 417/270; 474/112, 135, 69, 74, 903; 192/415, 566, 81 C, 107 T, 107 M

[56] References Cited

U.S. PATENT DOCUMENTS 5,865,604  2/1999  Kawaguchi et al. ................. 417/222.2

FOREIGN PATENT DOCUMENTS

| 764782 | 3/1997 | European Pat. Off. . |
|---|---|---|
| 340422 | 12/1993 | Japan . |
| 28446 | 1/1996 | Japan . |
| 121333 | 5/1996 | Japan . |
| 121336 | 5/1996 | Japan . |
| 8-159028 | 6/1996 | Japan . |
| 8-338441 | 12/1996 | Japan . |
| 512 781 | 9/1939 | United Kingdom . |
| 2 245 546 | 1/1992 | United Kingdom . |

*Primary Examiner*—David A. Bucci
*Assistant Examiner*—Marcus Charles
*Attorney, Agent, or Firm*—Woodcock Washburn Kurtz Mackiewicz & Norris LLP

[57] ABSTRACT

A drive power transmission apparatus having an elastically deformable unit formed by combining at least one torque limiting coil spring arranged between a first rotating unit which includes a hub-like plate attached to a drive shaft supported for rotation on a housing of a rotation-receiving unit such as a compressor and a second rotating unit which includes a pulley element driven by a drive power source and supported for rotation on the housing of the rotation-receiving unit via an angular-contact bearing. The elastically deformable unit of the apparatus normally provides an operative interconnection between the first and second rotating units to transmit a drive power from the drive power source to the rotation receiving unit, but disengages one from the other when a load torque produced by the rotation-receiving unit exceeds a predetermined limiting torque in order to interrupt the transmission of the load torque from the rotation-receiving unit to the drive power source.

14 Claims, 5 Drawing Sheets

ω1: ANGULAR VELOCITY OF THE PULLEY
ω2: ANGULAR VELOCITY OF THE HUB-LIKE PLATE ($\omega 1 \doteqdot \omega 2$)

($\omega 2 < \omega 1$)

POWER TRANSMISSION APPARATUS

BACKGROUND OF THE INVENTION

1. Field of the Invention

The present invention relates to a drive power transmission apparatus for transmitting a drive power from a drive power source to a first rotating means incorporated in a rotation-receiving unit via a second rotating means incorporated in a drive power source by operatively connecting the first and second rotating means. More specifically, the present invention relates to a drive power transmission apparatus capable of suspending an operative interconnection between the first and second rotating means when an excessively high reactive load torque is produced by the rotation-receiving unit due to some trouble in the rotation-receiving unit, so that any adverse affect on the drive power source due to the excessively high reactive load may be prevented. The present invention is preferably but non-exclusively applicable to a power transmission apparatus for transmitting a drive power from a vehicle engine to a clutchless-type or a clutch-incorporating-type refrigerant compressor.

2. Description of the Related Art

Japanese Unexamined Patent Publication (Kokai) No. 8-159028 discloses a typical conventional power transmission apparatus incorporated between, for example, a vehicle engine and a refrigerant compressor. The conventional power transmission apparatus has a plurality of rolling balls interposed between a pulley operatively connected to a drive power source (the vehicle engine) by a belt, and a rotated member formed as a hub-like plate fixed to a rotatable power transmitting shaft (a drive shaft of the refrigerant compressor) incorporated in a drive power receiving unit (the refrigerant compressor). In the normal operating state, the plurality of rolling balls are received in both ball receiving recesses formed in the rotated member and ball retaining recesses formed in the pulley, respectively. The pulley and an angular bearing unit mounted on the housing of the compressor are elastically urged toward the rotated member by a preloading spring, such as a disk spring. The rotation of the pulley is transmitted through the rolling balls and the rotated member to the rotatable shaft. In this power transmission apparatus, the rolling balls are forced to move out of the retaining recesses to interrupt power transmission from the pulley to the rotated member when a load torque produced by the rotation receiving unit, i.e., a refrigerant compressor is excessively large.

In the conventional power transmission apparatus, the rolling balls are arranged in a peripheral part of the rotated hub-like plate, and therefore, the rolling balls are subject to the effect of centrifugal force when the rotated hub-like plate member rotates together with the pulley. Accordingly, the rolling balls might be forced to move out of the ball receiving recesses of the rotated hub-like plate and the ball retaining recesses of the pulley by centrifugal force. Namely, the transmission of a drive power might be unintentionally interrupted even if a load torque produced by the rotation receiving unit is not excessively large.

SUMMARY OF THE INVENTION

Therefore, an object of the present invention is to provide a drive power transmission apparatus which can surely prevent an occurrence of an unintentional interruption of the transmission of a drive power from a drive power source to a rotation receiving unit while the rotating means incorporated in the rotation receiving unit is operating at a high rotating speed, and can exhibit reliable and stable power-interrupting characteristics depending on a change in a load torque produced by the rotation receiving unit.

Another object of the present invention is to provide a power transmission apparatus suitable for being arranged between a drive power source and a rotation receiving unit, and allowing a limiting load torque, at which the transmission of a drive power should be interrupted, to be freely determined and set.

In accordance with the present invention, there is provided a power transmission apparatus for transmitting a drive power from a drive power source to a rotation-receiving unit by operatively connecting a first rotating means incorporated in the rotation-receiving unit and a second rotating means incorporated in the drive power source, which comprises:

an elastically deformable means for detachably interconnecting between the first and second rotating means, the elastically deformable means being torsionally deformed by a load torque produced by the rotation-receiving device during the transmission of a drive power from the second to first rotating means; and, means for detaching the interconnection between the first and second rotating units provided by the elastically deformable means when a torsional deformation of the said elastically deformable means reaches an extent indicating that a load torque produced by the rotation-receiving unit exceeds a predetermined upper limiting torque determined by a resilience of said elastically deformable means.

The first and second rotating means engaged by the elastically deformable means are not disengaged unless the load torque produced by the rotation receiving unit exceeds the predetermined upper limit torque dependent on the resilience of the elastically deformable means disconnectably connecting the first and second rotating means. Accordingly, a power transmitting function to transmit power from the second to the first rotating body can be maintained to transmit a drive power from the drive power source to the rotation receiving unit unless the load torque produced by the rotation receiving unit exceeds the predetermined upper limiting load torque.

If the load torque produced by the rotation receiving unit increases beyond the predetermined upper limiting load torque dependent on the resilience of the elastically deformable means due to an unpredictable cause, the elastically deformable means is torsionally distorted to change its diameter and, consequently, the first and second rotating means are disconnected from one another and the transmission of a drive power from the second rotating means to the first rotating means is interrupted. Thus, propagation of an adverse influence of the excessively high load torque exceeding the predetermined upper limit torque to the drive power source can be automatically prevented by the transmission-interrupting action of the elastically deformable means of the drive power transmission apparatus and, consequently, it is possible to prevent the drive power source from being provided with any adverse effect due to the excessive load torque by the rotation receiving unit.

In the described drive power transmission apparatus, the upper limit torque as a threshold torque for the interruption of a drive power can be determined mainly on the basis of the resilience of the elastically deformable means. Therefore, the degree of freedom in the determining and setting an upper limit torque can be increased, and the elastically deformable means can have a stable power transmission interrupting characteristic. Differing from the conventional rolling balls employed in the drive power transmission apparatus of the prior art, the elastically deformable means does not malfunction due to a centrifugal force acting thereon during the rotation of the first and second rotating means, and hence an unpredictable or unexpected interruption of transmission of a drive power does not occur while the first rotating means of the rotation receiving unit is rotating at a high speed.

The second rotating means may be provided with an annular recess having its center on the axis of rotation of the second rotating means and the elastically deformable means may be disposed in the annular recess to form the drive power transmitting apparatus in a small-sized construction requiring a reduced space for installation.

Preferably, the elastically deformable means of the drive power transmission apparatus comprises at least one coil spring arranged between the first and second rotating means. The employment of the coil spring for -the elastically deformable means allows to easily determine and set the resilience of the elastically deformable means, and accordingly can be very effective from the viewpoint of practical use in the drive power transmission apparatus.

Preferably, one of the first and second rotating means is provided with a spring retaining part formed therein for permitting the coil spring to be engaged with and disengaged from one of the first and second rotating means. Then, the coil spring preferably has a first end engaging with the spring retaining part formed in one of the first and second rotating means, and a second end connected to the other of the first and second means so as to be able to transmit a drive power from the second rotating means to the first rotating means. Thus, the first end of the coil spring is engaged with and disengaged from the rotating means provided with the spring retaining part, and the second end of the coil spring is connected to the other rotating means so as to be able to transmit power. Accordingly, the coil spring, i.e., the elastically deformable means, rotates together with the rotating means to which the second end of the coil spring is connected, and the first end of the coil spring is disengaged from the spring retaining part to disengage the first and second rotating means from one another when an excessive load torque is transmitted thereto through either of the rotating means.

Alternatively, the elastically deformable means may comprise a plurality of coil springs assembled together. Then, the plurality of coil springs have first ends, respectively, which are equiangularly arranged about a common axis of the plurality of assembled coil springs and are detachably connected to spring retaining parts formed in one of the first and second rotating means, and the plurality of coil springs further have second ends, respectively arranged equiangularly about the common axis of the plurality of assembled coil springs to be connected to the other of the first and second rotating means to thereby be able to transmit a drive power from the second rotating means to the first rotating means. Since the plurality of assembled coil springs are balanced with one another, and since any moment or any offset load that dislocates the coil springs relative to the center axis is not produced, the elastically deformable means constructed by assembling the plurality of coil springs can avoid the adverse effects of moment or offset load that may be produced by the elastically deformable means including a single coil spring on the associated parts and elements.

The plurality of coil springs of the elastically deformable means are preferably compressed between the first and second rotating means.

The compressed coil springs function as an elastically urging means for urging the first and second rotating means to be spaced away from one another. Thus, by properly using the urging action of the coil spring or springs, the internal mechanism of the rotation receiving unit may also be elastically urged through the first rotating means, to result in simplifying the internal mechanism of the rotation receiving unit or reduction in the number of the component parts of the rotation receiving unit. The elastically urging action exhibited by the coil spring or the coil springs may be applied to the second rotating means for the same effects.

Further, the spring retaining part may be a recess defined by a bearing surface which bears a drive power transmitted from the drive power source exerted thereon by the first end of the elastically deformable means.

The bearing surface defining the recess bears the drive power of the drive power source to transmit the drive power through the first rotating means to the rotation receiving unit. The elastically deformable means is torsionally distorted and part of the elastically deformable means is separated from the recess to disconnect the elastically deformable means from the bearing surface when the load torque produced by the rotation receiving unit exceeds the predetermined upper limit torque. Consequently, the operative connection of the first and second rotating means is disrupted to interrupt the transmission of a drive power from the second rotating means to the first rotating means.

In the drive power transmission apparatus according to one preferred embodiment of the present invention, the bearing surface may be inclined at a predetermined angle to a radial direction of the first rotating means.

Since the bearing surface inclined relative to a radial direction of the first rotating means guides the first end of the elastically deformable means in contact with the bearing surface in a direction to move out of the recess, the first end of the elastically deformable means is able to move out of the recess smoothly, which improves the response of the power transmission interrupting action of the elastically deformable means.

In an embodiment, the second rotating means comprises a pulley connected to the drive power source by a belt, and the pulley includes a cylindrical inner hub, a cylindrical outer rim around which the belt is wound, and an annular groove formed between the cylindrical inner hub and the cylindrical outer rim for receiving therein the elastically deformable means. Then, the first rotating means may comprise a drive shaft provided for the rotation receiving unit, and a hub-like plate element integrally connected to the drive shaft.

BRIEF DESCRIPTION OF THE DRAWINGS

The above and other objects, features and advantages of the present invention will be made apparent from the ensuing description of the preferred embodiments with reference to the accompanying drawings wherein.

DESCRIPTION OF THE PREFERRED EMBODIMENTS

The present invention will be described hereinafter as applied to a drive power transmission apparatus incorporated into a variable capacity refrigerant compressor for a vehicle air conditioning system. The compressor which will be described below is a clutchless-type compressor not requiring a clutch mechanism, such as a solenoid clutch, to be incorporated therein as power transmission apparatus for transmitting the output drive power of a vehicle engine, i.e., a drive power source, thereto. A power transmission apparatus according to a preferred embodiment of the present invention is employed instead of such a clutch mechanism and serves as means for transmitting drive power in a normal operation and as means for interrupting a power transmission in case of emergency.

[Construction of Compressor]

Figure 1:
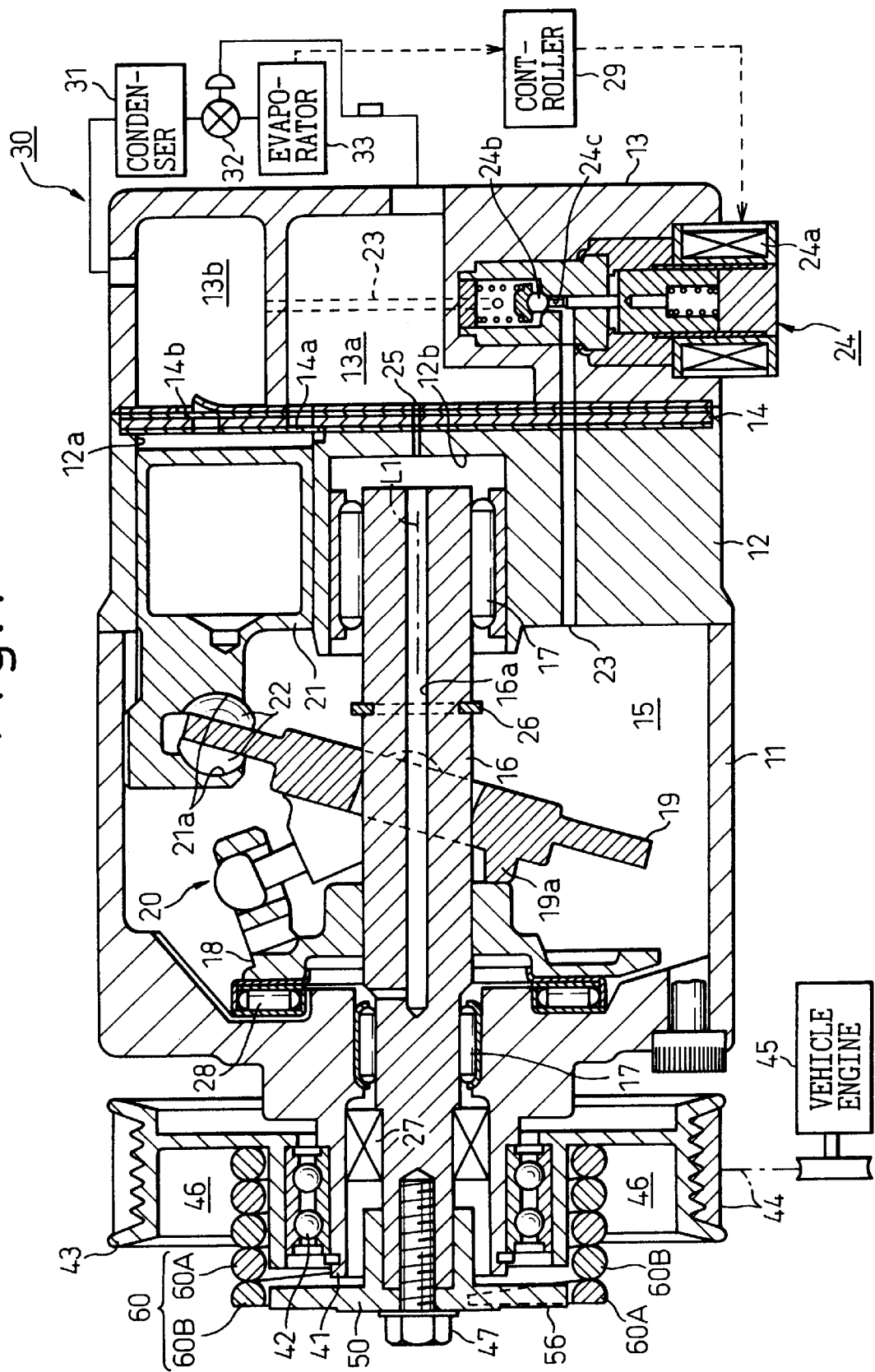
FIG. 1 is a longitudinal sectional view of a variable capacity refrigerant compressor in which a drive power transmission apparatus according to an embodiment of the present invention is incorporated.

The clutchless type variable capacity refrigerant compressor, i.e., a rotation receiving unit, will be described. In FIG. 1, 'front' signifies 'left' and 'rear' signifies 'right'.

Referring to FIG. 1, a housing unit of a compressor includes a front housing 11, a cylinder block 12 having a front end to which the front housing 11 is fixedly joined, and, a rear housing 13. The cylinder block 12 functioning as a central housing, and the rear housing 13 is fixedly joined to the rear end of the cylinder block 12 via a valve plate 14. Namely, the valve plate 14 ia sandwiched between the cylinder block 12 and the rear housing 13.

A suction chamber 13a and a discharge chamber 13b surrounding the suction chamber 13a are formed in the rear housing 13. The valve plate 14 is provided with a suction valve 14a and a discharge valve 14b. The suction valve 14a is attached to a front face of the valve plate 14, and the discharge valve 14b is attached to a rear face of the valve plate 14. The front housing 11 and the cylinder block 12 define an internal chamber therebetween functioning as a crank chamber 15. A drive shaft 16 is axially extended through the crank chamber 15 and is supported for rotation on the front housing 11 and the cylinder block 12 by a pair of radial bearings 17, 17. A shaft sealing element 27 is fitted in a space between the outer circumference of a front end part of the drive shaft 16 and the front housing 11. The drive shaft 16 and a later-described hub-like plate 50 form a first rotating means to receive a drive power transmitted thereto from an external drive power source.

A lug-plate or rotor element 18 is fixedly mounted on the drive shaft 16 within the crank chamber 15. A thrust bearing 28 is interposed between the lug plate 18 and an inner end surface of the front housing 11. A swash plate 19, i.e., a cam plate, is supported on the drive shaft 16 within the crank chamber 15 so as to be slidable along and to be inclined relative to the axis "L1" of the drive shaft 16. The lug plate 18 and the swash plate 19 are linked together by a hinge unit 20. The swash plate 19 can be tilted relative to the axis "L1" of the drive shaft 16 and can be rotated together with the drive shaft 16 via the hinge unit 20.

The cylinder block 12 is provided with a plurality of cylinder bores 12a (only one of the cylinder bores 12a is shown). The cylinder bores 12a have axes parallel to that of the drive shaft 16 and are arranged at equal angular intervals around the drive shaft 16. Single-headed pistons 21 are fitted in the cylinder bores 12a for reciprocation in the cylinder bores 12a. Each single-headed piston 21 has a hollow head part to compress a refrigerant gas and a tail end part projecting from the rear end of the head part into the crank chamber 15. The tail end part of each single-headed piston 21 is provided with a pair of spherical recesses 21a formed therein to be longitudinally opposite to each other.

A peripheral part of the swash plate 19 is fitted in spaces between the pairs of spherical recesses 21a of the single-headed pistons 21 and is connected to the tail end parts of the single-headed pistons 21 by pairs of shoes 22 placed in the spherical recesses 21a. When the inclined swash plate 19 rotates together with the drive shaft 16, the wobbling motion of the swash plate 19 is transmitted, via the shoes 22, to the single-headed pistons 21 to cause reciprocation of the single-headed pistons 21 in the respective cylinder bores 12a. Accordingly, a refrigerant gas in the suction chamber 13a forces the suction valve 14a to open to be sucked into the cylinder bores 12a, and is compressed by the single-headed pistons 21. The compressed refrigerant gas is discharged through the discharge valve 14b into the discharge chamber 13b.

A gas supply passage 23 is formed through the cylinder block 12, the rear housing 13 and the valve plate 14 so as to fluidly connect the crank chamber 15 and the discharge chamber 13b.

A capacity control valve 24 is arranged in the gas supply passage 23 in the rear housing 13. The capacity control valve 24 is a solenoid valve including at least a solenoid 24a, a spool 24b and a port-defining block having a port 24c opened and closed by the spool 24b. The port 24c is closed by the spool 24b when the solenoid 24a is energized, and is opened when the solenoid 24a is de-energized.

In the variable capacity type refrigerant compressor, the inclination of the swash plate 19 is controlled by adjusting the difference between a pressure prevailing in the crank chamber 15 acting on the rear end of the single-headed pistons 21, and the pressure in the cylinder bores 12a. The stroke of the single-headed pistons 21 is determined by controlling the inclination of the swash plate 19 to adjustably change the discharge capacity of the variable capacity type refrigerant compressor. The pressure within the crank chamber 15 is controlled by the opening and closing of the gas supply passage 23 through the on-off control of the solenoid 24a of the capacity control valve 24.

A pressure relief passage 16a is formed along the center axis "L1" in the drive shaft 16. The pressure relief passage 16a has a front end opening into the crank chamber 15, and a rear end opening into a cavity 12b formed in a substantially central part of the cylinder block 12. The cavity 12b communicates with the suction chamber 13a through a pressure relief port 25 formed in a substantially central part of the cylinder block 12 and the valve plate 14. The sectional area of the pressure relief port 25 is smaller than that of the gas supply passage 23.

In a state where the gas supply passage 23 is closed by the capacity control valve 24, the gas is discharged from the crank chamber 15 through the pressure relief passage 16a and the pressure relief port 25 into the suction chamber 13a to reduce the pressure prevailing in the crank chamber 15. Consequently, the pressure in the crank chamber 15 approaches the pressure in the suction chamber 13a, which is lower than the pressure in the discharge chamber 13b.

As shown in FIG. 1, the swash plate 19 is inclined at a maximum inclination and the discharge rate of the compressor increases. In a state where the gas supply passage 23 is opened, a high pressure gas is supplied from the discharge chamber 13b into the crank chamber 15 at a rate higher than the discharge rate. Then, the pressure in the crank chamber 15 increases and the inclination of the swash plate 19 is reduced to a minimum inclination to reduce the discharge capacity of the compressor. When the swash plate 19 is inclined at the maximum inclination, a stopper 19a on the swash plate 19 comes into contact with the lug plate 18. When the swash plate 19 is inclined at the minimum inclination, the swash plate 19 is in contact with a ring 26 secured to a substantially middle part of the drive shaft 16. The minimum angle of inclination of the swash plate 19 is slightly greater than 0°.

The suction chamber 13a and the discharge chamber 13b of the variable capacity type refrigerant compressor are connected through an external refrigerant circuit 30 forming part of the vehicle air conditioning system (refrigerating system). The external refrigerant circuit 30 has a condenser 31, an expansion valve 32 and an evaporator 33 as principal components. The evaporator 33 is connected through a controller 29 to the capacity control valve 24. The controller 29 controls the solenoid 24a of the capacity control valve 24 on the basis of input information given thereto by the evaporator 33.

[Power Transmission Apparatus]

The power transmission apparatus in the present embodiment will be described below.

Figure 2B:
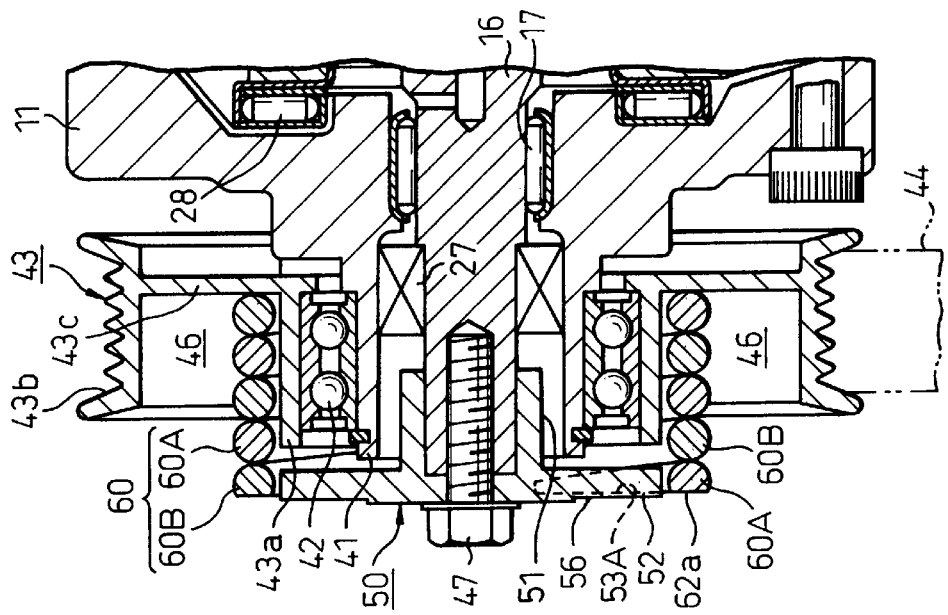
FIG. 2B is a longitudinal sectional view taken on line 2B—2B in FIG. 2A.
Figure 2A:
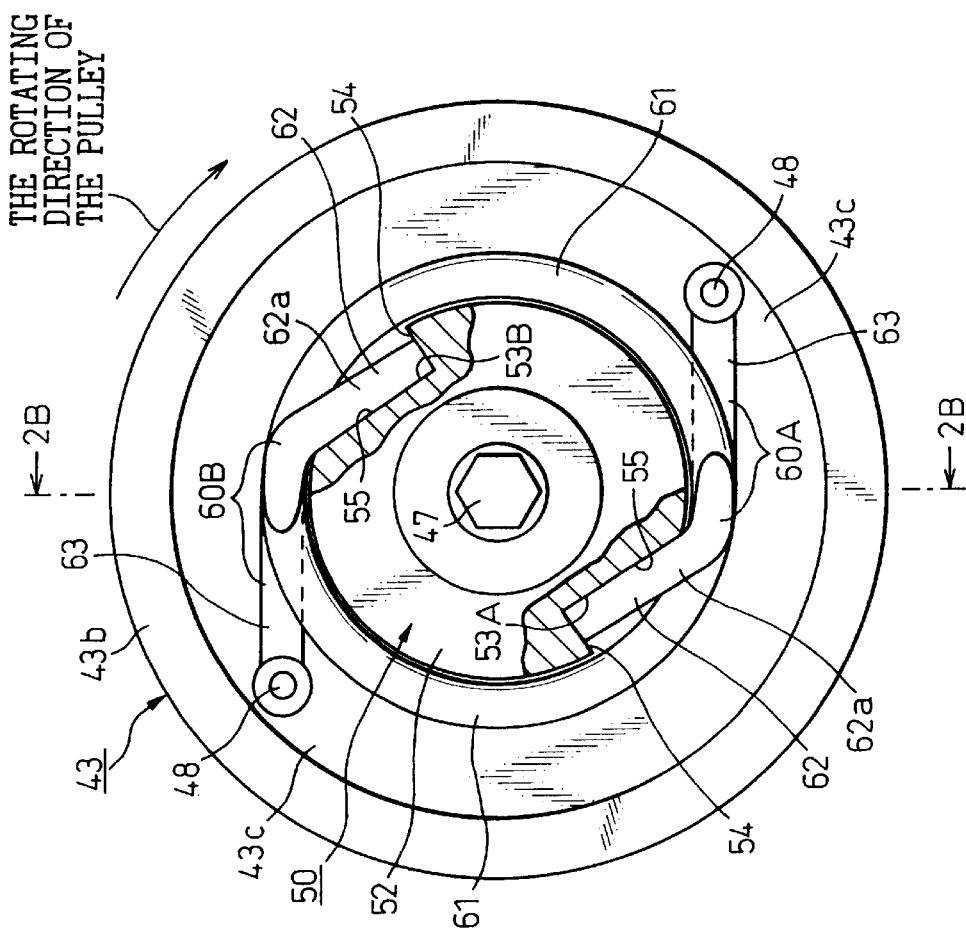
FIG. 2A is a partly cutaway front view of an essential part of a drive power transmission apparatus incorporated in the variable capacity refrigerant compressor of FIG. 1.

Referring to FIGS. 1, 2A and 2B, a cylindrical support portion 41 is formed in a front end part of the front housing 11 on the front side of the shaft seal element 27. An angular-contact bearing 42 is mounted on the cylindrical support portion 41. A pulley 43, i.e., a second rotating means incorporated in a drive power source, is fixedly mounted on the outer ring of the angular-contact bearing 42 for rotation relative to the cylindrical support portion 41. The pulley 43 is connected to a drive power source, i.e., a vehicle engine 45 of a vehicle by a belt 44 such as a V-belt.

The pulley 43 has a cylindrical hub 43a mounted on the outer ring of the angular-contact bearing 42, a cylindrical rim 43b, and a flange 43c extending between the hub 43a and the rim 43b. The hub 43a, the rim 43b and the flange 43c define an annular groove 46.

The hub-like plate 50 serving as a drive power receiving member is fixed to the front end of the drive shaft 1o with a screw bolt 47 so as to rotate together with the drive shaft 16. The drive shaft 16 and the hub-like plate 50 form the first rotating means incorporated in a drive power receiving unit, i.e., the refrigerant compressor in the present embodiment.

The hub-like plate 50 has a disk portion 52 and a cylindrical boss 51 projecting from a central part of the disk portion 52 and fitted on the front end part of the drive shaft 16. As best shown in FIG. 2A, the disk portion 52 is provided in its peripheral part with a pair of retaining recesses 53A and 53B.

In FIG. 2A, two front face portions defining later-described covering surfaces 56 of the disk portion 52 are cut away for the sake of easy understanding of the shape of the retaining recesses 53A and 53B. Each of the retaining recesses 53A and 53B has a radial first retaining surface 54 and a second retaining surface 55 extending substantially perpendicularly to the first retaining surface 54. Each of the retaining recesses 53A and 53B is formed to have an opening formed in the outer circumference of the disk portion 52 and extending over an angular range between the first retaining surface 54 and the second retaining surface 55. The retaining recesses 53A and 53E are formed also to have an opening formed in a back face of the disk portion 52, i.e., a disc portion facing the angular-contact bearing 42. Thus, the retaining recesses 53A and 53B are open toward the angular-contact bearing 42.

The front face portion of the disk portion 52 has two covering surfaces 56 to cover a part of the retaining recesses 53A and 53B. Namely, the two covering surfaces 56 form third retaining surfaces having a relatively small thickness and cooperating with the above-mentioned first retaining surface 54 and the second retaining surface 55. The retaining recesses 53A and 53B are not fully open in the front face of the disk portion 52 and are partly covered with the thin covering surface 56. One of portions of the retaining recesses 53A and 53B which are covered by the thin front face portions forming the above-mentioned covering surfaces 56 is specifically and typically shown in FIG. 5 (a dot-applied region "CA" in FIG. 5). Each of the retaining recesses 53A and 53B is defined by the first retaining surface 54, the second retaining surface 55 and the covering surface (the third retaining surface) 56.

The pair of retaining recesses 53A and 53B are formed diametrically opposite to each other with respect to the screw bolt 47 in the disk portion 52 of the hub-like plate 50; that is, the pair of retaining recesses 53A and 53B are formed at an angular interval of 180°.

Figure 3:
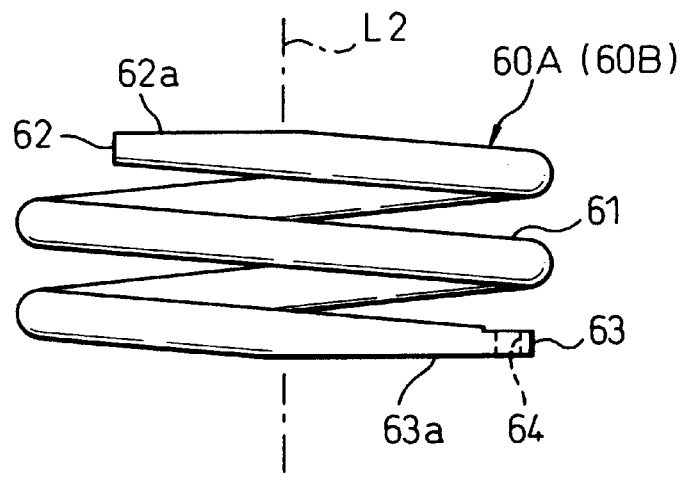
FIG. 3 is a side view of a torsion coil spring of the drive power transmission apparatus of FIGS. 1 through 2B.
Figure 4:
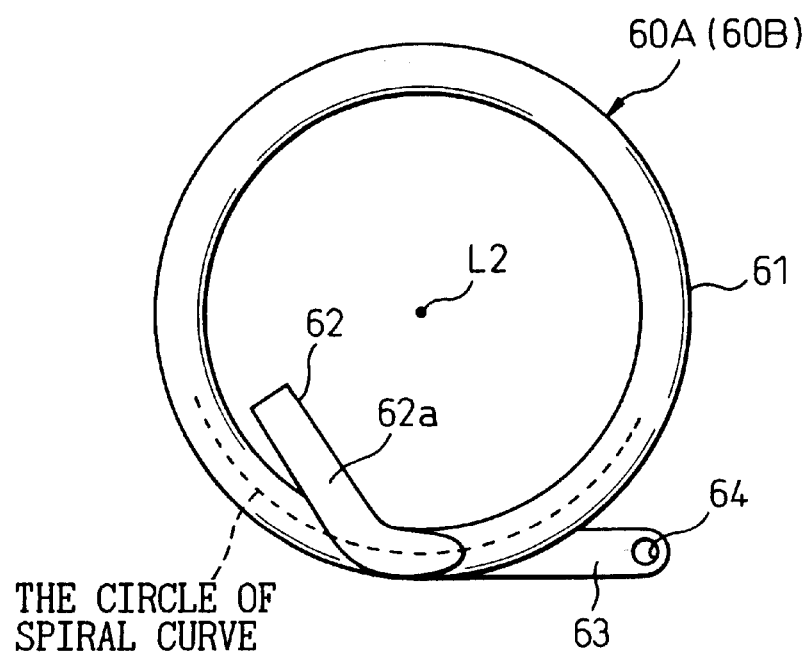
FIG. 4 is a front view of the torsion coil spring of FIG. 3.

Referring to FIG. 2A and 2B, a torque limiting spring 60, i.e., an elastically deformable means, is mounted on the hub 43a of the pulley 43. The torque limiting spring 60 is formed by combining two torsion coil springs 60A and 60B of a shape as shown in FIGS. 3 and 4. Each of the coil springs 60A and 60B has a body 61 formed by helically winding a wire, a first end part 62 formed by bending an end part of the wire inside a circle defined by the body 61, and a second end part 63 formed by extending the other end part of the wire in a direction tangent to the circle defined by the body 61 as shown in FIG. 4.

As best shown in FIG. 3, the opposite ends of each of the coil springs 60A and 60B are squared, and the first end part 62 and the second end part 63 have parallel end surfaces 62a and 63a, respectively. The end surfaces 62a and 63a are perpendicular to the center axis "L2" of the coil springs 60A and 60B. The second end part 63 of each of the coil springs 60A and 60B is provided with a hole 64 for a retaining member.

As shown in FIGS. 2A and 2B, the two coil springs 60A and 60B combined so that the first end parts 62 (or the second end parts 63) thereof are spaced angular interval of 180° about the center axis "L2" apart from each other to form the torque limiting spring 60. The torque limiting spring 60 may be considered as a doubled torsional-coil spring formed by helically winding two parallel spring wires.

The torque limiting spring 60 is placed in the annular groove 46 of the pulley 43 so as to surround the hub 43a. When combining the two torsion coil springs 60A and 60B with the hub-like plate 50, rivets 48 attached to the flange 43c of the pulley 43 are fitted in the holes 64 formed in the second end parts 63 of the coil springs 60A and 60B to support the coil springs 60A and 60B pivotally on the flange 43c of the pulley 43. Thus, a drive power can be transmitted from the pulley 43 to the torque limiting spring 60. The second end parts 63 need not necessarily be pivotally secured to the flange 43c, and may be fixed completely to the flange 43c.

The end surfaces 63a of the coil springs 60A and 60B are in sliding contact with the front side surface of the flange 43c. The two rivets 48 are diametrically opposite to each other with respect to the screw bolt 47.

After the second end parts 63 have thus been secured to the pulley 43, the two coil springs 60A and 60B are compressed, and the hub-like plate 50 is fastened to the drive shaft 16 by the screw bolt 47. In this state, the first end parts 62 of the two coil springs 60A and 60B are received in the retaining recesses 53A and 53B of the disk portion 52 of the hub-like plate 50, respectively. As shown in FIG. 2A, the first end parts 62 of the coil springs 60A and 60B are in contact with the first retaining surfaces 54 and the second retaining surfaces 55 of the retaining recesses 53A and 53B, respectively. The end surfaces 62a of the first end parts 62 are partly in contact with the covering surfaces 56 of the disk portion 52, and the axial pressure of the torque limiting spring 60 is born by the front side parts having the covering surfaces 56.

Thus, the pair of torsion coil springs 60A and 60B forming the torque limiting spring 60 are compressed between the flange 43c of the pulley 43 and the disk part 52 of the hub-like plate 50. In normal operation, the output power of the vehicle engine 45 is transmitted by the belt 44, the pulley 43, the coil springs 60A and 60B, and the hub-like plate 50 to the drive shaft 16. Thus, the torque limiting spring 60 serves also as a linking member for linking together the first and the second rotating means.

[Basic Operation of the Variable Capacity Type Refrigerant Compressor]

In a state shown in FIG. 1, where the capacity control valve 24 is closed to cut off the gas supply passage 23, the gas is discharged from the crank chamber 15 through the pressure relief passage 16a and the pressure relief port 25 into the suction chamber 13a to reduce the pressure prevailing in the crank chamber 15. Accordingly, the swash plate 19 is held at the maximum angle of inclination and the compressor operates at its maximum discharge capacity. The compressor thus exercises its maximum discharge ability for cooling the passenger room of the vehicle. The temperature of the evaporator 33 gradually decreases as the cooling load on the vehicle air conditioning system reduces. Upon a fall in the temperature of the evaporator 33 to below a predetermined set temperature "T1" at which frost starts to accumulate on the evaporator 33, the controller 29 opens the capacity control valve 24 to supply the high-pressure refrigerant gas from the discharge chamber 13b through the gas supply passage 23 into the crank chamber 15. Therefore, the angle of inclination of the swash plate 19 reduces from the maximum angle of inclination toward the minimum angle of inclination as the pressure in the crank chamber 15 increases.

When the swash plate 19 is set at the minimum angle of inclination, the compressor operates at its minimum discharge capacity. The cooling load increases due to the suppression of the discharge ability of the compressor. Then, the temperature of the evaporator 33 starts rising. Upon an increase in the temperature of the evaporator 33 beyond the predetermined set temperature "T1", the controller 29 closes the capacity control valve 24 to stop supplying the high-pressure refrigerant gas from the discharge chamber 13b into the crank chamber 15. Accordingly, the gas is discharged from the crank chamber 15 into the suction chamber 13a, and the swash plate 19 increases its angle of inclination to the maximum angle of inclination. Therefore, the discharge capacity of the compressor increases.

From the foregoing description, it will be understood that the angle of inclination of the swash plate 19 of the variable capacity type refrigerant compressor varies according to a change in the cooling load, and the discharge capacity (compressing ability) of the compressor unit is varied by a feedback control manner.

[Operation of the Power Transmission Apparatus]

In the normal operation, the output power of the vehicle engine (a drive power source) 45 is transmitted by the belt 44, the pulley 43, the torque limiting spring 60 (the coil springs 60A and 60B) and the hub-like plate 50 to the drive shaft 16. As shown in FIG. 2A, the two coil springs 60A and 60B having the second end parts 63 connected to the pulley 43 rotate together with the pulley 43. The first end parts 62 of the rotating coil springs 60A and 60B push the hub-like plate 50 by the first retaining surfaces 54 to produce a moment to rotate the hub-like plate 50 and the drive shaft 16 fastened to the hub-like plate 50 in the direction of rotation of the pulley 43. Thus, the hub-like plate 50 and the drive shaft 16 rotates together with the pulley 43.

When the drive power is thus transmitted to the drive shaft 16, the swash plate 19 operatively connected to the drive shaft 16 drives the single-headed pistons 21 to suck and compress the refrigerant gas. Therefore, a load torque proportional to the condition of the work, i.e., the condition of production of load, acts on the drive shaft 16 and the hub-like plate 50 in a direction opposite the rotating direction of the pulley 43.

While the load torque remains below a predetermined upper limit torque, and is on a level which is not high enough to exert impermissible effects on the belt 44 and the vehicle engine 45, the transmission of a drive power from the pulley 43 through the coil springs 60A and 60B and the hub-like plate 50 to the drive shaft 16 is conducted without interruption. Even if a load torque fluctuates in a range below the predetermined upper limit torque due to a change in the pressures among the different cylinder bores 12a, a change in a compression load and the like, the fluctuation of the load torque can satisfactorily be absorbed by the resilience of the coil springs 60A and 60B of the torque limiting spring 60 as long as a power transmission operation is maintained.

Figure 5:
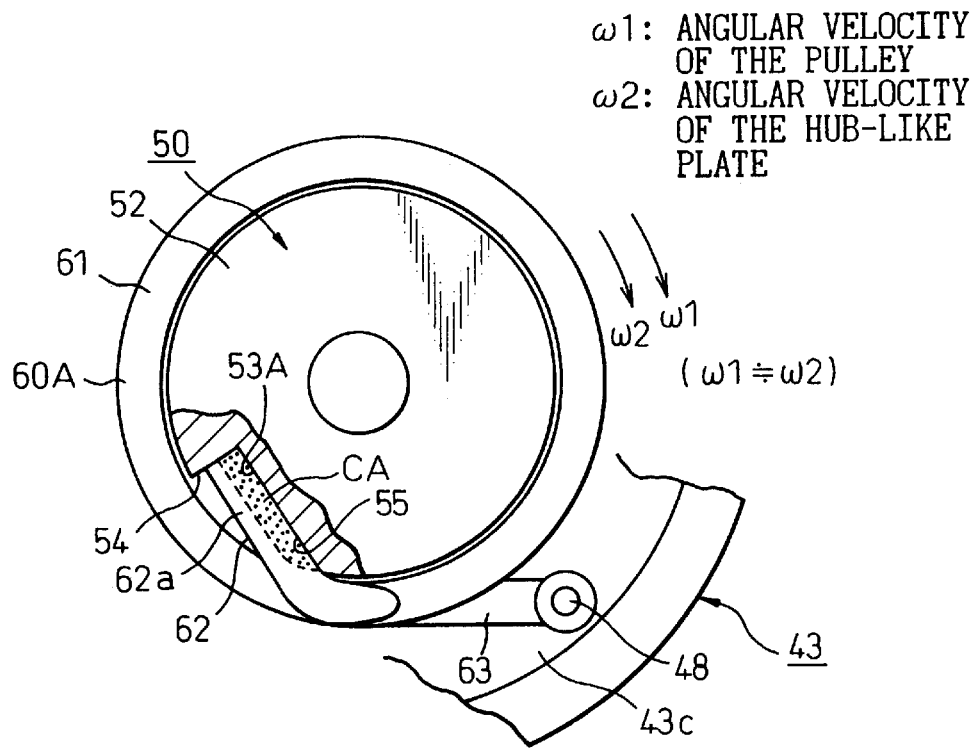
FIG. 5 is a front view of the torsional coil spring, for the assistance in explanatorily illustrating the action of the torsional coil spring in a state where a drive power is being transmitted.
Figure 6:
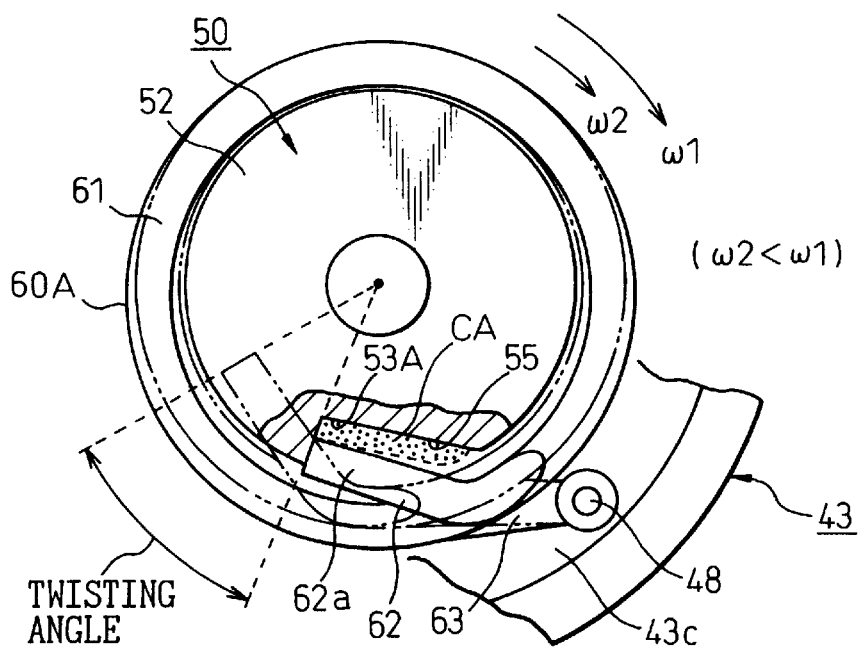
FIG. 6 is a similar view of assistance in explanatorily illustrating the action of the coil spring in a state where the transmission of a drive power is interrupted; and, FIG. 7 is a front view, similar to FIG. 2A, of a drive power transmission apparatus according to another embodiment of the present invention.

If an excessive load torque, exceeding the upper limit torque, is applied to the drive shaft 16 and the hub-like plate 50 due to an unpredictable trouble occurring in the compressor, such as seizure of internal movable elements of the compressor, the torque limiting spring 60 changes from a power transmitting state shown in FIG. 5 to a power transmission interrupting state shown in FIG. 6. In FIGS. 5 and 6, only the coil spring 60A of the torque limiting spring 60 and the retaining recess 53A for the coil spring 60A are shown for simplicity. The torque limiting spring 60 is in the power transmitting state shown in FIG. 5 while the load torque is below the predetermined upper limit torque and is in the power transmission interrupting state shown in FIG. 6 when the load torque exceeds the predetermined upper limit torque.

Typically, the operation of only the coil spring 60A will be described hereinbelow.

When the torque limiting spring 60 is in the power transmitting state shown in FIG. 5, the first end part 62 of the coil spring 60A lies in the retaining recess 53A substantially in contact with the second retaining surface 55 of the power transmitting end plate 50. The end surface 62a of the first end part 62 is partly in contact with the contact region "CA", i.e., a region shaded with dots, of the covering surface 56 of the disk portion 52 of the hub-like plate 50.

If the load torque acting on the drive shaft 16 exceeds the predetermined upper limit torque, whereas the pulley 43 tries to rotate together with the coil spring 60A, the hub-like plate 50 and the drive shaft 16 strongly resist rotation with the pulley 43 and tend to rotate at an angular velocity "ω2" different from that "ω1" of the pulley 43. Then, the coil spring 60A yields to the excessive load torque and is forced to be elastically deformed in a coil unwinding direction. Thus, the coil spring 60A is twisted so that the second end part 63 connected to the pulley 43 and the first end part 62 placed in the retaining recess 53A approach each other and, consequently, the body 61 is deformed elastically to increase the diameter thereof.

When the diameter of the body 61 of the coil spring 60A is thus increased, the first end part 62 of the coil spring 60A separates from the second retaining surface 55 of the retaining recess 53A and moves outward along the second retaining surface 54. The area of the part of the covering surface 56 in contact with the end surface 62a of the first end part 62, i.e., the part corresponding to the contact region "CA", reduces gradually, the entire first end part 62 moves out of the contact region "CA" and, eventually, the first end portion 52 is disengaged from the covering surface 56 of the hub-like plate 50.

Upon the disengagement of the first end part 62 from the covering surface 56, the compressed coil spring 60A extends axially to restore its original shape and the first end part 62 moves forward beyond the disk portion 52 of the hub-like plate 50. Accordingly, the coil spring 60A is disengaged completely from the hub-like plate 50 to interrupt transmission of a drive power from the pulley 43 to the drive shaft 16.

The operation of the other coil spring 60B is the same as that of the coil spring 60A described above with reference to FIGS. 5 and 6. Thus, both the coil springs 60A and 60B are disengaged substantially simultaneously from the hub-like plate 50 to interrupt the transmission of a drive power.

The above-described embodiment of the present invention exhibits the advantageous effects as set forth below.

The drive power transmission apparatus interrupts a power transmission from the vehicle engine 45 of the vehicle through the pulley 43 and the hub-like plate 50 to the drive shaft 16 automatically if an excessive load torque is produced by the compressor (the drive power receiving unit). Therefore, the exertion of the adverse effect of the excessive load torque produced by the compressor on the vehicle engine 45 (the drive power source) can be prevented and all of the elements incorporated in the drive power source can be protected.

The upper limit torque (a threshold torque for power transmission interruption) can be determined by properly adjusting the torsional rigidity (the resilience) of the torque limiting spring 60. Therefore, the drive power transmission apparatus is able to exhibit stable power transmission interrupting characteristics. Further, the torque limiting spring 60 is not caused to malfunction by a centrifugal force during the rotation of the first and second rotating means, an accidental interruption of the power transmission encountered by the conventional drive power transmission apparatus does not occur even while the pulley 43 is rotating at a high rotating speed.

The power transmission apparatus of the present embodiment does not need any vibration isolating members, such as rubber pads, needs a reduced number of component parts and elements, and has a simple construction. Excessive noise and unpleasant vibration can be reduced by properly determining the spring constant of the torque limiting spring 60.

The variation of torque applied to the drive shaft 16 can be absorbed by the torsional distortion of the torque limiting spring 60 provided that the load torque produced by the compressor per se is not higher than the predetermined upper limit torque.

The coil springs 60A and 60B of the torque limiting spring 60 are compressed between the pulley 43 and the hub-like plate 50 and, therefore, the torque limiting spring 60 urges the hub-like plate 50 and the drive shaft 16 frontward. Since the drive shaft 16 is pulled toward the front by the torque limiting spring 60, an elastic member for separating the rear end of the drive shaft 16 from the bottom surface of the cavity 12b of the cylinder block 12 is not necessary. Therefore, the torque limiting spring 60 simplifies both the construction of the drive power transmission apparatus and that of the compressor.

Since the torque limiting spring 60 is placed in the annular groove 46 formed in the pulley 43, the pulley 43 of the drive power transmission apparatus can be formed in a small axial dimension. The use of the annular groove 46 of the pulley 43 for installing the torque limiting spring 60 increases the degree of freedom in designing the torque limiting spring 60.

The torque limiting spring 60, i.e., the principal component of the drive power transmission apparatus, includes the two coil springs 60A and 60B, the respective first end parts 62 and the respective second end parts 63 of the coil springs 60A and 60B are disposed at equal angular intervals (angular intervals of 180° in the present embodiment), respectively. Therefore, a moment that will incline the hub-like plate 50 and the drive shaft 16 relative to the axis "L1" is not produced and hence the rotation of the hub-like plate 50 and the drive shaft 16 is stabilized. Consequently, the abrasion of the component members is limited to the least possible amount and power loss can be suppressed. Since the two coil springs 60A and 60B support each other, the torque limiting spring 60 formed by combining the two coil springs 60A and 60B can stably maintain its correct position.

The drive power transmission apparatus in the present embodiment has a large utility when applied to a clutchless compressor. Although the drive power transmission apparatus has a simple, compact construction, the drive power transmission apparatus is capable of surely interrupting the transmission of a drive power in an emergency, and hence an expensive, bulky solenoid clutch is not necessary.

The following modifications of the foregoing embodiment may be easily made by persons skilled in the art.

The drive power transmission apparatus shown in FIGS. 1 to 6 is not provided with any solenoid clutch. However, a modified drive power transmission apparatus from the apparatus shown in FIGS. 1 to 6 may be constructed by incorporating a solenoid clutch into the drive power transmission apparatus of FIGS. 1 to 6. In such a modification, the force of the torque limiting spring 60 acting in a forward direction can be used for urging the armature of the solenoid clutch to eliminate maintenance work for adjusting the gap between the armature and the pulley.

Figure 7:
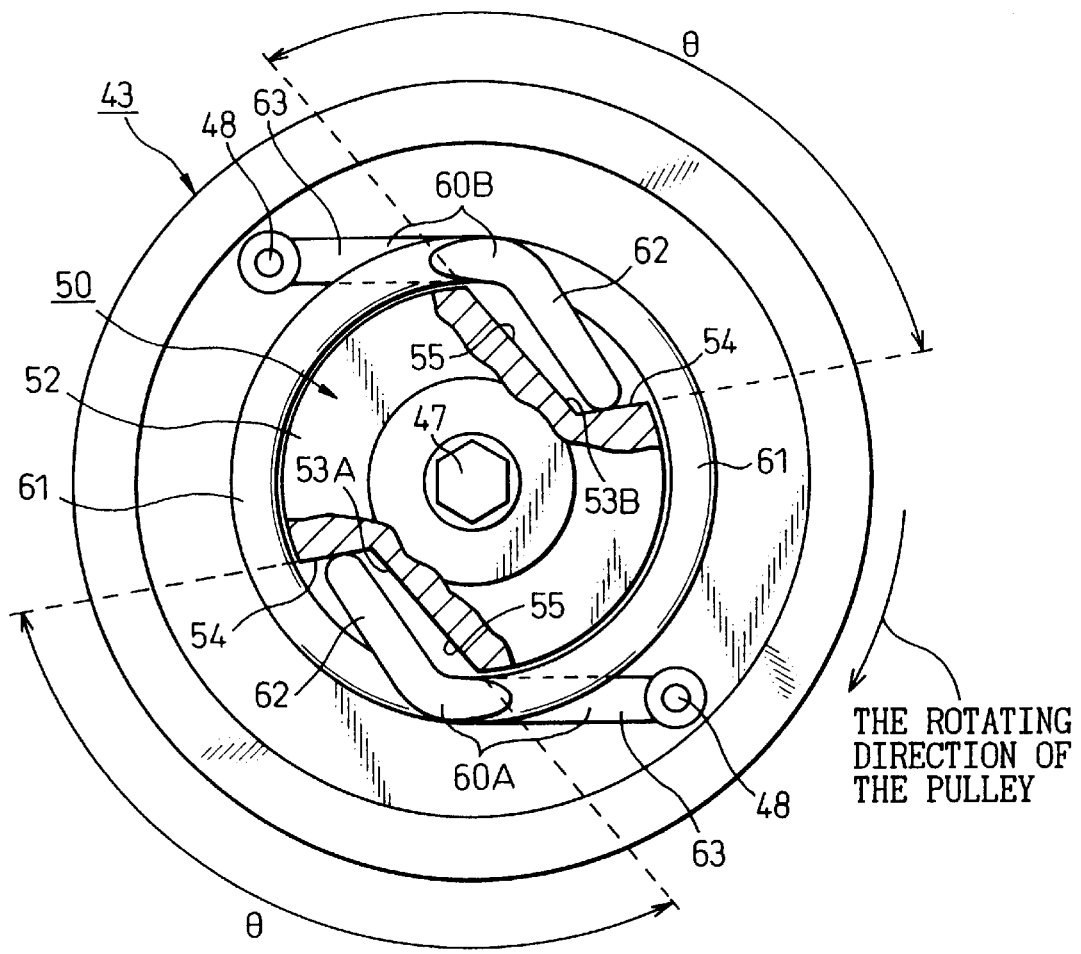

As shown in FIG. 2A, each of the retaining recesses 53A and 53B of the hub-like plate 50 is defined by the first retaining surface 54 and a second retaining surface 55 extending substantially perpendicularly to the first retaining surface 54. In a modification, the retaining surfaces 54 and 55 may form an obtuse angle "φ" therebetween as shown in FIG. 7. In this modification, the first retaining surface 54 in contact with the extremity of the second end part 62 of each of the coil springs 60A and 60B is inclined, at an angle of (φ−90°), to a radius of the hub-like plate 50. Since the first retaining surfaces 54 are thus inclined, the first end parts 62 are able to move out of the retaining recesses 53A and 53B smoothly and quickly when power transmission needs to be interrupted, so that the response characteristic of the drive power transmission apparatus in interrupting of the power transmission is improved.

In the embodiment shown in FIGS. 1 through 6 and the modification shown in FIG. 7, the torque limiting spring 60 may be formed by only one of the torsion coil spring 60A and 60B to form a single coil-spring type torque limiting spring. Further, and as required, the torque limiting spring 60 may be formed by combining three or more similar coil springs. It is considered that the torque limiting spring 60 should preferably include at least one coil spring.

In the embodiment shown in FIGS. 1 through 6 and the modification shown in FIG. 7, the second end parts 63 of the torsion coil springs 60A and 60B are fixedly connected to the pulley 43, and the first ends 62 of the same coil springs 60A and 60B are held on the hub-like plate 50 so as to be able to be disengaged from the hub-like plate 50.

Alternatively, the second end parts 63 of the torsion coil springs 60A and 60B may be pivotally connected to the hub-like plate 50, and the first end parts 62 of the coil springs 60A and 60B may be held on the flange 43c of the pulley 43 so as to be able to be disengaged from the flange 43c of the pulley 43. Then, the flange 43c of the pulley 43 should be provided with recesses corresponding to the retaining recesses 53A and 53B of the hub-like plate 50 and with covering surfaces corresponding to the covering surfaces 56 of the hub-like plate 50.

In the embodiment shown in FIGS. 1 through 6 and the modification shown in FIG. 7, the pair of torsion coil springs 60A and 60B forming the torque limiting spring 60 are disposed to be compressed between the flange 43c of the pulley 43 and the disk portion 52 of the hub-like plate 50. Nevertheless, as required, the torsion coil springs 60A and 60B may be disposed to be extended between the pulley 43 and the hub-like plate 50.

It will be understood from the foregoing description that, in accordance with the present invention, unpredictable interruption of the transmission of a drive power does not occur while the rotation-receiving unit such as a refrigerant compressor is running at a high rotating speed. Thus, a stability and a reliability in the transmission-interrupting characteristic of a drive power can be enhanced.

Further, the elastically deformable unit of the drive power transmission apparatus normally and operatively connects the first of the rotation-receiving unit to the second rotating means of the drive power source to transmit a drive power from the drive power source to the rotation-receiving unit, and is able to surely disengage one from the other by a change in the diameter of the elastically deformable unit per se when a load torque produced by the rotation receiving unit increases up above a specified limiting torque (a threshold torque) which can be determined by adjustably setting a resiliency thereof in order to prevent the load torque transmitting from the rotation-receiving unit to the drive power source. Therefore, the drive power transmission apparatus has a high degree of freedom in setting the threshold torque for power transmission interruption.

It should be understood that many changes and modifications may occur to a person in the art without departing from the spirit and scope of the invention as claimed in the accompanying claims.

What we claim:

1. A drive power transmission apparatus for transmitting a drive power from a drive power source to a rotation-receiving unit by operatively connecting a first rotating means incorporated in the rotation-receiving unit and a second rotating means incorporated in the drive power source comprising:

an elastically deformable means for detachably interconnecting between the first and second rotating means, said elastically deformable means comprising at least one elastically deformable body portion arranged loosely between said first and second rotating means and having opposite ends formed as first and second ends said elastically deformable body portion being torsionally deformed between said first and second ends by a load torque produced by the rotation-receiving unit during the transmission of a drive power from said second to first rotating means; and means for detaching the interconnection between said first and second rotating means provided by said elastically deformable means when a torsional deformation of said elastically deformable body portion reaches an extent indicating that a load torque produced by said rotation-receiving unit exceeds a predetermined upper limiting torque determined by a resilience of said elastically deformable means;

wherein at least one of said first and second rotating means is provided with a retaining part formed therein as a recess having a bearing surface with which said first end of said elastically deformable body portion is in contact to receive a drive power of said drive power source.

2. The drive power transmission apparatus according to claim 1, wherein the interconnection between said first and second rotating means is detached by said means for detaching the interconnection between said first and second rotating means due to a change in a diameter of said elastically deformable body portion of said elastically deformable means accompanied by the torsional deformation of said elastically deformable body portion.

3. The drive power transmission apparatus according to claim 1, wherein said elastically deformable body portion of said elastically deformable means comprises coil spring spirally extending between said first and second ends of said elastically deformable body portion and arranged between said first and second rotating means.

4. The drive power transmission apparatus according to claim 3, wherein said retaining part of said at least one of said first and second rotating means comprises a spring retaining part permitting said first end of said coil spring to be engaged with and disengaged from said one of said first and second rotating means, and wherein said second end of said coil spring is connected to the other of said first and second rotating means so as to be able to transmit a drive power from said second rotating means to said first rotating means.

5. The drive power transmission apparatus according to claim 1, wherein said elastically deformable means comprises a plurality of said elastically deformable body portions in the form of a plurality of springs assembled together, said plurality of springs each having first ends, which are equiangularly arranged about a common axis of said plurality of springs and are detachably connected to spring retaining parts formed in said one of said first and second rotating means, and said plurality of springs each further having second ends, arranged equiangularly about the common axis of said plurality of springs to be connected to the other of said first and second rotating means to thereby be able to transmit a drive power from said second rotating means to said first rotating means.

6. The drive power transmission apparatus according to claim 5, wherein said plurality of springs of said elastically deformable means are compressed between said first and second rotating means.

7. The drive power transmission apparatus according to claim 5, wherein each of said plurality of springs comprises a coil spring, and wherein said spring retaining parts of said at least one of said first and second rotating means comprise a plurality of recesses formed in said at least one of said first and second rotating means, each of said recesses having a bearing surface with which said first end of each of said coil springs is in press-contact to receive a drive power of said drive power source.

8. The drive power transmission apparatus according to claim 4, wherein said spring retaining part comprises a recess formed in said at least one of said first and second rotating means, said recess having a bearing surface with which said first end of said coil spring is in press-contact to receive a drive power of said drive power source.

9. The drive power transmission apparatus according to claim 8, wherein said bearing surface of said recess of said at least one of said first and second rotating means is inclined at a predetermined angle with respect to a radial direction of the first rotating means.

10. The drive power transmission apparatus according to claim 3, wherein said coil spring of said elastically deformable means is compressed between said first and second rotating means.

11. The drive power transmission apparatus according to claim 1, wherein said second rotating means comprises a pulley connected to said drive power source by a belt, said pulley including a cylindrical inner hub, a cylindrical outer rim around which said belt is wound, and an annular groove formed between said cylindrical inner hub and said cylindrical outer rim for receiving therein said elastically deformable means.

12. The drive power transmission apparatus according to claim 11, wherein said first rotating means comprises a rotatable drive shaft provided for said rotation-receiving unit, and a hub-like plate element integrally connected to said drive shaft.

13. The drive power transmission apparatus according to claim 1, wherein said rotation-receiving unit comprises a refrigerant compressor including a drive shaft which cooperates with a hub-like plate element to constitute said first rotating means, and wherein said second rotating means comprises a drive pulley element receiving the drive power from said drive power source via a power transmission belt.

14. The drive power transmission apparatus according to claim 13, wherein said refrigerant compressor is incorporated in a vehicle refrigerating system and is driven by said drive power source constituted by a vehicle engine.

* * * * *

UNITED STATES PATENT AND TRADEMARK OFFICE
CERTIFICATE OF CORRECTION

PATENT NO. : 6,152,845 Page 1 of 1
DATED : November 28, 2000
INVENTOR(S) : Okada et al.

It is certified that error appears in the above-identified patent and that said Letters Patent is hereby corrected as shown below:

Column 5,
Line 35, delete "14 ia" and insert therefor -- 14 is --.

Column 7,
Line 46, delete "drive shaft lo" and insert therefor -- drive shaft 16 --.

Column 14,
Line 40, delete "comprises coil spring" and insert therefor -- comprises a coil spring --.

Column 15,
Line 16, delete "claim 4" and insert therefor -- claim 1 --.

Signed and Sealed this

Fourteenth Day of May, 2002

*Attest:*

JAMES E. ROGAN
*Attesting Officer*     *Director of the United States Patent and Trademark Office*